United States Patent
Biewer et al.

(10) Patent No.: US 7,533,928 B2
(45) Date of Patent: May 19, 2009

(54) WINDOW DEFLECTOR MECHANISM FOR A VEHICLE SLIDING ROOF SYSTEM

(75) Inventors: Christian Biewer, Altheim (DE); Michael Jugl, Sulzbach (DE)

(73) Assignee: ArvinMeritor GmbH, Dietzenbach (DE)

( * ) Notice: Subject to any disclaimer, the term of this patent is extended or adjusted under 35 U.S.C. 154(b) by 0 days.

(21) Appl. No.: 11/690,204

(22) Filed: Mar. 23, 2007

(65) Prior Publication Data

US 2007/0236052 A1 Oct. 11, 2007

(30) Foreign Application Priority Data

Apr. 6, 2006 (EP) .................................. 06007294

(51) Int. Cl.
*B60J 7/043* (2006.01)
(52) U.S. Cl. .................................... 296/217; 296/180.1
(58) Field of Classification Search .............. 296/180.1, 296/180.2, 180.4, 217
See application file for complete search history.

(56) References Cited

U.S. PATENT DOCUMENTS

2008/0067839 A1* 3/2008 Staltmayer ................. 296/217

FOREIGN PATENT DOCUMENTS

| DE | 37 43 476 | 7/1988 |
|---|---|---|
| DE | 101 37 650 | 2/2003 |
| EP | 1 281 555 | 2/2003 |
| WO | WO 2006/000340 A1 * | 1/2006 |

OTHER PUBLICATIONS

European Search Report Dated Aug. 25, 2006.

* cited by examiner

*Primary Examiner*—Lori L Lyjak
(74) *Attorney, Agent, or Firm*—Carlson, Gaskey & Olds

(57) ABSTRACT

A wind deflector mechanism for a vehicle sliding roof system includes a wind deflector lever attached to a wind deflector element. The wind deflector lever is attachable to a vehicle and can be swiveled between a home position and a raised position. A raising lever is coupled to the wind deflector lever and swivels the wind deflector lever between the home position and the raised position. A raising spring acts upon the raising lever substantially in such a manner that the raising lever biases the wind deflector lever toward the raised position.

16 Claims, 6 Drawing Sheets

WINDOW DEFLECTOR MECHANISM FOR A VEHICLE SLIDING ROOF SYSTEM

RELATED APPLICATIONS

The application claims priority to European Patent Application No. 06 007 294.9, which was filed on Apr. 6, 2006.

BACKGROUND OF THE INVENTION

The invention relates to a wind deflector mechanism for a vehicle sliding roof system.

A wind deflector mechanism of a vehicle sliding roof functions to improve flow conditions whenever a cover of the sliding roof system is in an open position. As seen in a direction of travel, the wind deflector is usually provided on a front edge of a roof opening that is exposed by the cover and is transferred from a lowered position in which the wind deflector is situated underneath an outer surface of the vehicle roof to a raised position when the cover is opened.

From DE 102 10 142, there is known a wind deflector that includes a wind deflector element that is configured as a flexible net or fabric, with the wind deflector element being arranged between two supporting elements. A first supporting element is firmly attached to the vehicle roof, and a second supporting element is moved between a lowered position and a raised position. A leg spring serves as a hinge between the two supporting elements and can bias the second supporting element toward the raised position. It is possible that such wind deflectors could be unintentionally displaced with respect to an operational angle as soon as an acting wind-induced force is larger than a pretension of the leg spring. If the wind deflector is displaced, it is not possible to prevent wind noises, which could be annoying.

The invention therefore is based on the object to provide a wind deflector mechanism with which it is possible to achieve, without any large technical effort, a constant raising level that is independent from an air stream.

SUMMARY OF THE INVENTION

This problem is solved by a wind deflector mechanism for a vehicle sliding roof that includes a wind deflector lever attached to a wind deflector element. The wind deflector lever is attachable to a vehicle and is swiveled between a home position and a raised position. A raising lever is coupled to the wind deflector lever and can swivel the wind deflector lever between the home position and the raised position. A raising spring acts upon the raising lever in such a manner that the raising lever biases the wind deflector lever substantially toward the raised position.

The invention benefits from the fact that a raising force is produced in the raised position by a rigid component, namely the raising lever, which is arranged such that the raising lever cannot be displaced by a wind-induced force, and thus reliably transfers the wind-induced forces into a vehicle body. The raising spring does not serve to take up the wind loads, but acts upon the raising lever in such a manner that the raising lever maintains the raised position in which the raising lever is perpendicular to the wind deflector lever. As there are no forces that are taken up by the raising spring, the wind deflector lever is prevented from being displaced unintentionally. The wind deflector mechanism provides a functionally safe wind deflector without any large technical effort.

The raising lever can be coupled with the wind deflector lever such that in the raised position, a self-locking occurs where the wind deflector lever cannot be shifted toward the home position through the forces acting on it by the air stream. The existing wind-induced forces are completely taken up by the raising lever and the wind deflector lever. No component from the wind-induced force acts on the raising spring, so that the wind deflector lever is prevented from being displaced unintentionally.

The wind deflector element can be a net or a fabric, and the amount of an open cross-section on an overall cross-section of the wind deflector element can be used to adjust flow conditions in a desired way when the cover of the sliding roof system is open.

A working point for a movable component of the sliding roof system can be provided on a raising lever. The movable component is part of a mechanism for a closing and opening system of the sliding roof, so that there is no need for arranging additional components for raising and lowering the raising lever.

According to a first embodiment, a working point for a movable component of the sliding roof system is provided on the raising lever in order to bias the wind deflector lever toward the raised position and the home position. The movable component, in particular the cover of the sliding roof system, causes the raising of the wind deflector lever. Thus, an additional leg spring for raising the wind deflector lever is not necessary.

The raising spring can be arranged relative to a swivel axis of the raising lever in such a manner that it keeps the raising lever in the home position when the wind deflector lever is in the home position. A bearing of the raising spring is arranged to lie somewhat underneath a swivel bearing of the raising lever and pulls the raising lever downward so that the raising lever can be retained in the home position. As such, a retaining mechanism for retaining the raising lever in the home position can be omitted. This, however, does not alter the fact that the raising spring acts upon the raising lever, over a significant part of its swiveling range, substantially in a direction in which the raising lever is biased upwards.

According to a second embodiment, a leg spring is provided that biases the wind deflector lever toward the raised position. When the wind deflector lever moves, the leg spring will be pretensioned from the raised position to the home position. The leg spring acts upon the wind deflector lever toward the raised position as soon as the cover has been shifted to an at least partially opened position.

These and other features of the present invention can be best understood from the following specification and drawings, the following of which is a brief description.

DETAILED DESCRIPTION OF THE PREFERRED EMBODIMENT

Figure 1:
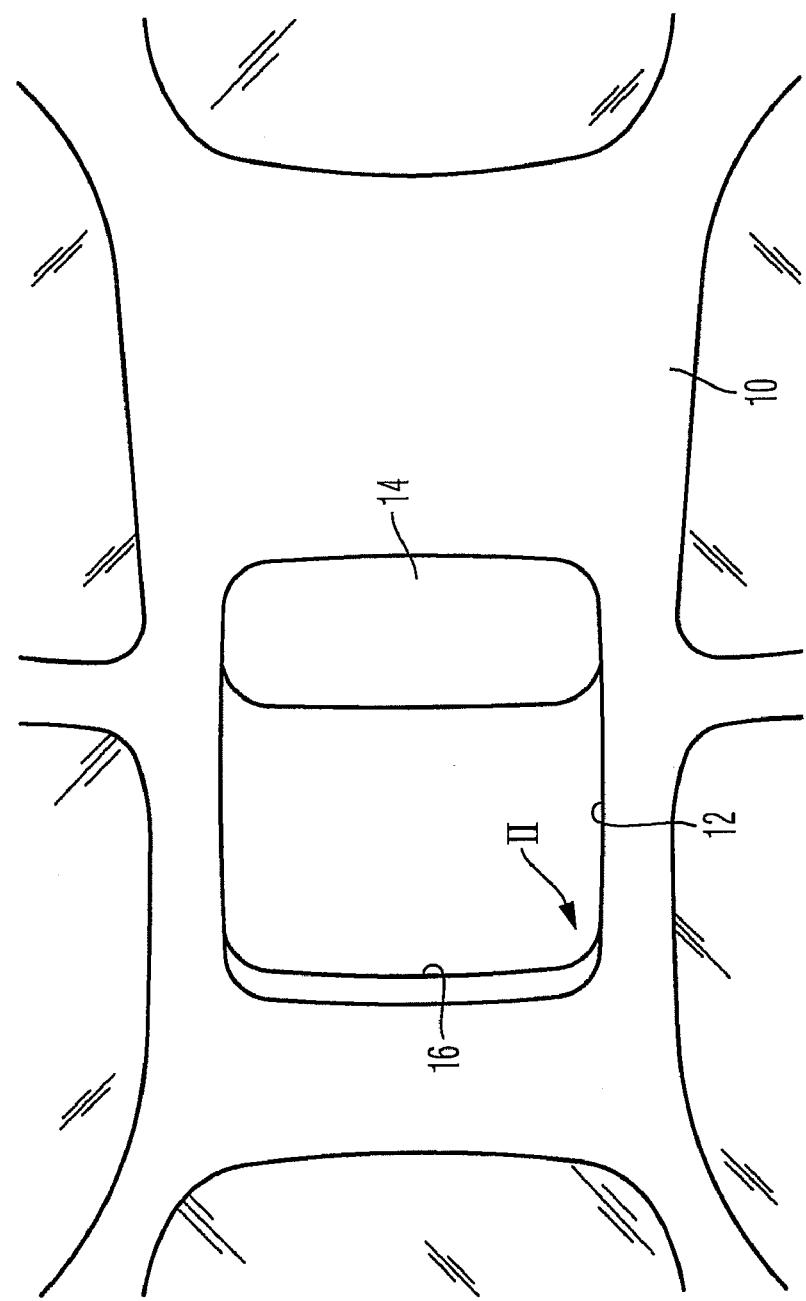
FIG. 1 shows a top view of a vehicle roof comprising a sliding roof system and a wind deflector mechanism.

FIG. 1 shows a vehicle roof 10 that has a sliding roof system comprising a roof opening 12 and a cover 14. The cover 14 can be shifted from a closed position, in which the cover 14 closes the roof opening 12, to an open position which is shown in FIG. 1, and in which the roof opening 12 is exposed for the most part.

On a front edge of the roof opening 12 with regard to the vehicle, a wind deflector mechanism 16 is attached that can be raised outwardly when the cover 14 is in an at least partially open position in order to improve flow conditions and prevent any annoying noises.

Figure 2:
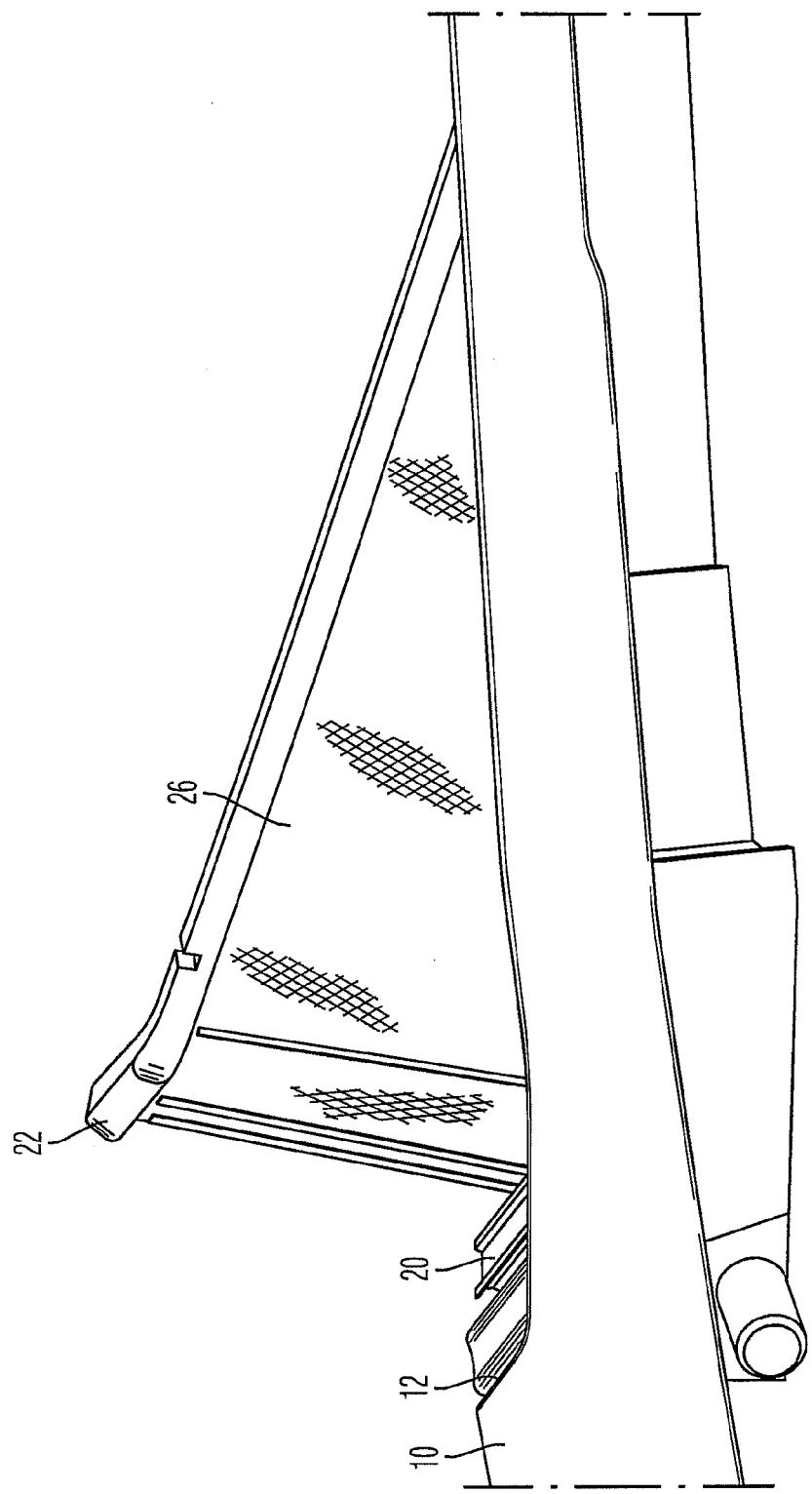
FIG. 2 is a perspective, cut view of a wind deflector mechanism in a raised condition according to the prior art.
Figure 3:
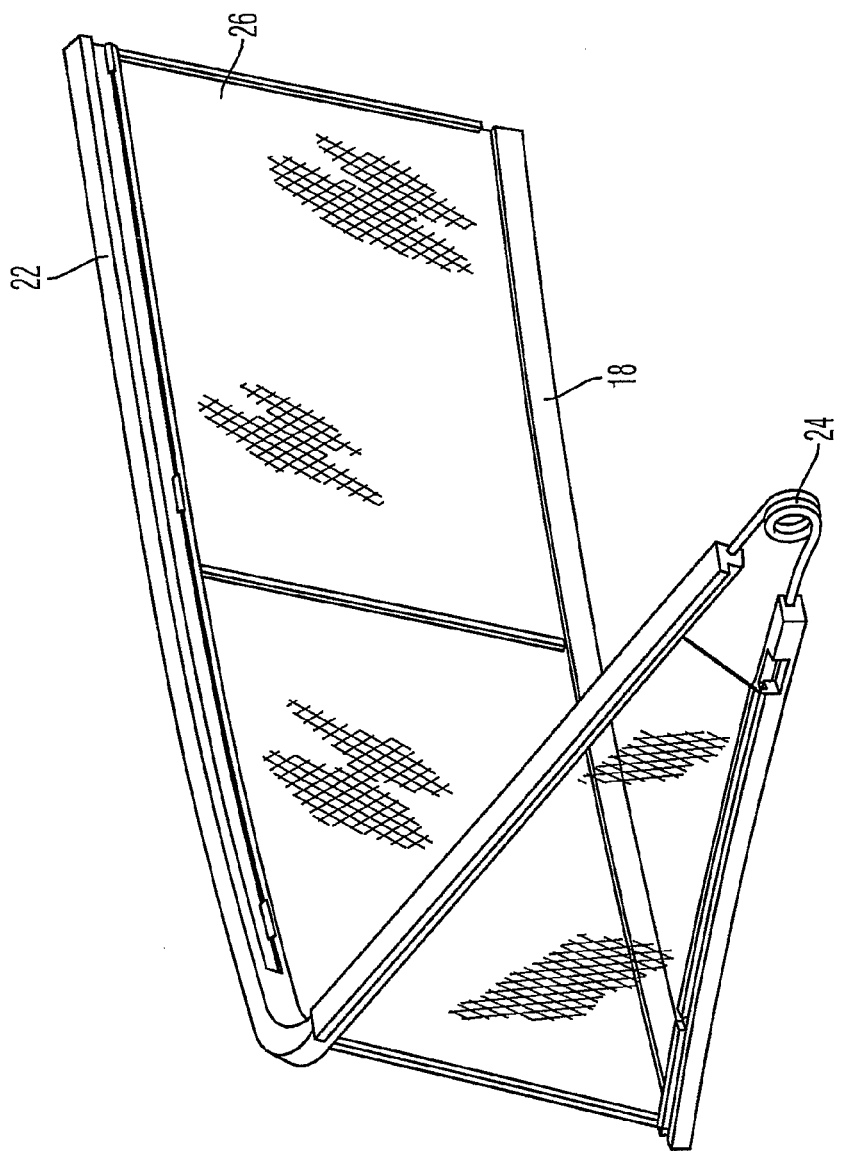
FIG. 3 is a perspective view of the wind deflector mechanism of FIG. 2, where the wind deflector mechanism is not mounted to the vehicle roof.

FIGS. 2 and 3 show a wind deflector mechanism according to the prior art. The wind deflector includes a first supporting element 18 that is firmly attached to a vehicle or to a mounting frame 20, and a second supporting element 22 that can be swiveled relative to the first supporting element 18. The two supporting elements 18, 22 are U-shaped, with a middle part extending along a front edge of the roof opening 12 and with two legs of each extending along a front portion of two side edges that surround the roof opening 12. Each of the legs of the first and second supporting elements 18, 22 has a leg spring 24 attached to it. The leg spring 24 serves as a hinge between the first and second supporting elements 18, 22 and biases the second supporting element 22 toward a raised position in which the second supporting element 22 is above an outer surface of the vehicle roof 10. This position is shown in FIGS. 2 and 3. Provided between the first supporting element 18 and the second supporting element 22 is a wind deflector element 26 comprised of a flexible material that is permeable to air, for instance a fabric or a plastic film that is permeable to air.

As the second supporting element 22 is held in the raised position solely by pretension of the leg spring 24, the second supporting element 22 is inadvertently shifted toward the first supporting element 18 as soon as a wind-induced force exceeds the pretension of the leg spring 24.

Figure 6:
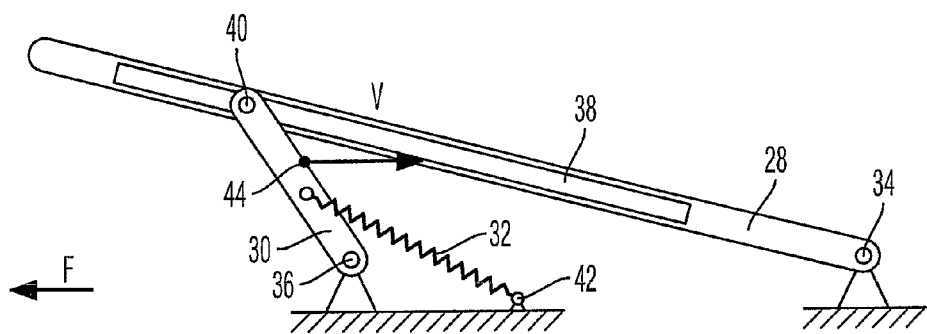
FIG. 6 is a schematic view of the wind deflector mechanism of FIG. 4 in a second intermediate position.
Figure 7:
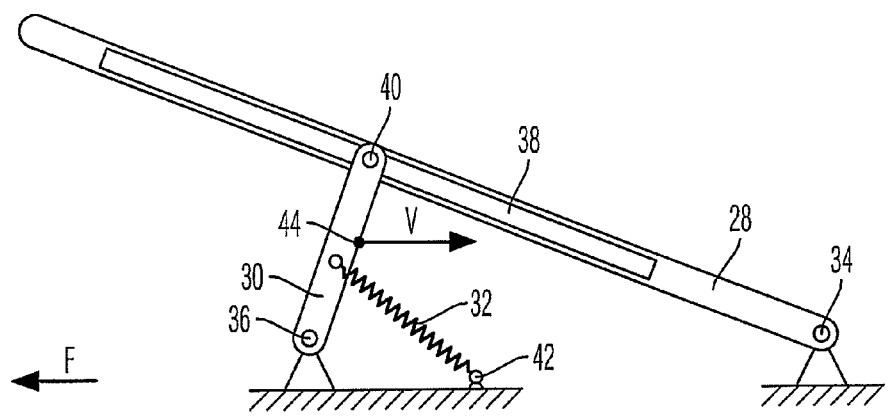
FIG. 7 is a schematic view of the wind deflector mechanism of FIG. 4 in a raised position.
Figure 8:
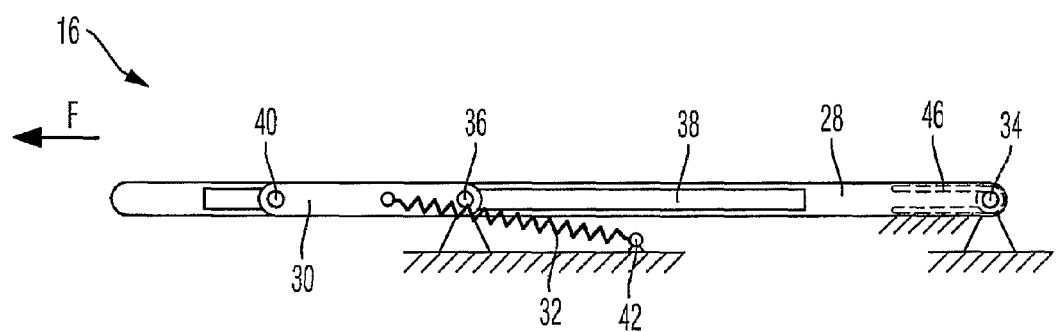
FIG. 8 is a schematic view of a wind deflector mechanism of the invention according to a second embodiment in a home position.
Figure 9:
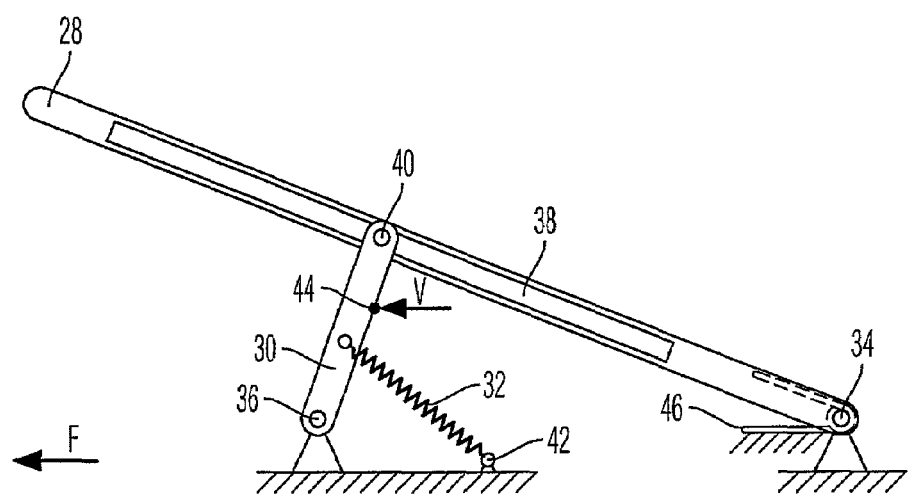
FIG. 9 is a schematic view of the wind deflector mechanism of FIG. 8 in a raised position.

FIGS. 4 to 7 schematically show a wind deflector mechanism 16 of the invention in a first embodiment, whereas FIGS. 8 and 9 show the wind deflector mechanism in a second embodiment. The same reference symbols will be used for the components known from prior art, and in this respect reference is made to the above explanations.

A wind deflector lever 28 is provided that is substantially U-shaped and extends along the front edge of the roof opening 12 and along the front portion of the two side edges which surround the roof opening 12. The wind deflector lever 28 has a guiding slot 38 that is engaged by a stud 40 of a raising lever 30. The wind deflector lever 28 can be the second supporting element which is known from prior art and is provided with a guiding slot 38.

Arranged on the wind deflector lever 28 is a wind deflector element (not shown), as it is known from prior art.

The wind deflector lever 28 can be swiveled by the raising lever 30 around a bearing 34 between a home position (FIG. 4) in which the wind deflector lever 28 lies underneath an outer sheet of the vehicle roof 10, and a raised position (FIG. 7) in which it lies above the outer sheet of the vehicle roof 10.

At an end opposite the stud 40, the raising lever 30 is pivotally supported by a swivel bearing 36 on a vehicle body and can be biased by a movable component of the sliding roof system (working point 44) toward the raised position (FIG. 7). The movable component is part of a closing and opening system of the cover 14, for instance, or even the cover 14 itself.

A raising spring 32, configured as a tension spring, engages the raising lever 30. The raising spring 32 is able to retain the raising lever 30 in the home position (FIG. 4) and in the raised position (FIG. 7). At an opposite end, the raising spring 32 is supported on the vehicle body by a bearing 42 that is situated underneath, i.e., positioned vertically lower than the swivel bearing 36 of the raising lever 30.

Figure 4:
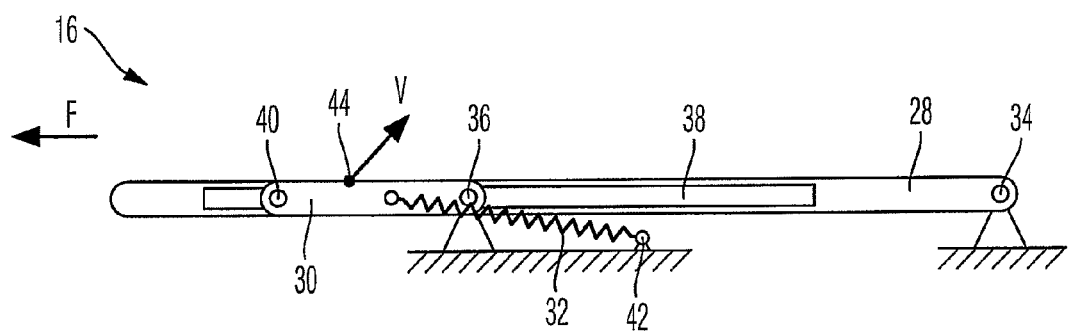
FIG. 4 is a schematic view of a wind deflector mechanism of the invention according to a first embodiment in a home position.

FIG. 4 shows the wind deflector mechanism 16 in the home position in which the raising lever 30 is approximately parallel to the wind deflector lever 28, with the stud 40 being situated in front of the swivel bearing 36 of the raising lever 30 in the direction of travel F. The raising spring 32 retains the raising lever 30 in the home position because the bearing 42 of the raising spring 32 is arranged underneath the swivel bearing 36 and the raising spring 32 pulls the raising lever 30 downward.

Figure 5:
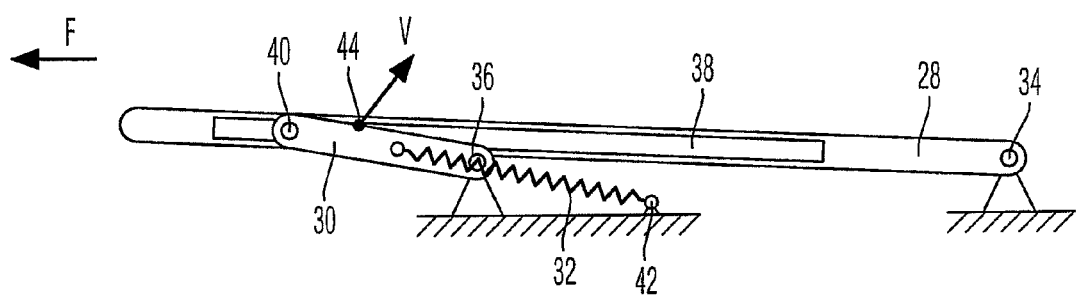
FIG. 5 is a schematic view of the wind deflector mechanism of FIG. 4 in a first intermediate position.

FIG. 5 shows the wind deflector mechanism 16 in a first intermediate position that is attained when the movable component engages the raising lever 30 and shifts the raising lever 30 in a shifting direction V. In this process, the stud 40 is shifted in the guiding slot 38, and the raising lever 30 and the wind deflector lever 28 connected therewith will be raised by a small amount. In the first intermediate position, the raising lever 30 and the raising spring 32 lie on a straight line. The raising spring 32 is in its dead center position from which the raising spring 32 can click in both directions, i.e., upwards or downwards.

FIG. 6 shows a second intermediate position that will be attained when the movable component shifts the raising lever 30 further in the shifting direction V. In this process, the stud 40 is moved in the guiding slot 38 toward the bearing 34, whereby the raising lever 30 and the wind deflector lever 28 are further raised.

FIG. 7 shows the raised position that is attained when the movable component shifts the raising lever 30 through the working point 44 further in the shifting direction V. In the raised position, the raising lever 30 is perpendicular to the wind deflector lever 28. The raising spring 32 acts upon the raising lever 30 so that the raising lever 30 assumes this position, and has its shortest length in this position. When the wind deflector mechanism 16 is in the raised position, the cover 14 of the sliding roof system is in an at least partially opened position.

At least in the vicinity of the raised position, a produced raising force is larger than a force of the raising spring 32, which prevents the wind deflector lever 28 from inadvertently being shifted to the home position by the wind-induced force. In the raised position, the arising wind-induced forces are transferred entirely to the vehicle body by the bearing 34 of the wind deflector lever 28 and the swivel bearing 36 of the raising lever 30. The raising spring 32 does not serve to take up the wind loads, but acts on the raising lever 30 such that the raising lever 30 maintains the raised position in which the raising lever 30 is perpendicular to the wind deflector lever 28. As the raising spring 32 does not take up any forces, the wind deflector lever 28 is prevented from shifting unintentionally.

When the cover 14 is shifted against the direction of travel F to the closed position, the wind deflector mechanism 16 is moved through the intermediate positions to the lowered position, with the movable component engaging the raising lever 30 through the working point 44. In this process, the line of action of the raising spring 32 alters. During transition from the raised position to the first intermediate position, the raising spring 32 is pretensioned until a dead center (FIG. 5) is reached. After this, the raising spring 32 maintains the raising lever 30 in the lowered position. It is due to the raising spring 32, and the alteration of its line of action, that the raising lever 30 is stably held in the lowered position and in the raised position as well.

The second embodiment of the wind deflector mechanism 16 differs from the first in the fact that a leg spring 46 is provided that engages in an area of the bearing 34 of the wind deflector lever 28. The leg spring 46 can bias the wind deflector lever 28 toward the raised position. In this embodiment, it is not necessary that the movable component engages the raising lever 30 to transfer the raising lever 30 to the raised position. The movable component engages the raising lever 30 only to transfer the raising lever 30 to the home position. The exact mode of operation will be explained in the following.

The wind deflector mechanism 16 is retained in the home position by the closed cover 14 (FIG. 8), because the cover 14 rests at the wind deflector lever 28 and presses the wind deflector lever 28 downward. In this position, the leg spring 46 is pretensioned.

As the cover 14 is shifted to the open position (i.e., on moving the cover 14 against the direction of travel F), the wind deflector lever 28 is biased by the pretensioned leg spring 46 toward the raised position or an intermediate position, as soon as the cover 14 disengages from the wind deflector lever 28. The raising spring 32 biases the raising lever 30 toward the raised position as soon as the raising spring 32 has exceeded its dead center. During raising, the stud 40 is shifted in the guiding slot 38 until the raising lever 30 is perpendicular to the wind deflector lever 28.

In the raised position, the raising lever 30 exclusively serves as an arresting device for the wind deflector lever 28. The raising spring 32 ensures that the raising lever 30 stays in its position in which it is perpendicular to the guiding slot 38.

As the cover 14 is shifted in the direction of travel F, the wind deflector mechanism 16 moves to the lowered position, the movable component engaging the raising lever 30 through the working point 44. In this process, the raising lever 30 is displaced from the position in which the raising lever 30 is perpendicular to the wind deflector lever 28, whereby a shifting is made possible at all. The movable component subsequently can engage the wind deflector lever 28 to bring the wind deflector mechanism 16 to the home position. as shifting the wind deflector lever 28 is shifted from the raised position, through the intermediate positions, which essentially correspond to those of the first embodiment, to the home position, the leg spring 46 will be pretensioned.

The wind deflector mechanism 16 is retained in the home position by the movable component against the force of the leg spring 46.

Both embodiments ensure a wind deflector mechanism with a raising level that does not alter depending on the air stream, whereby annoying wind noises can be prevented.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A wind deflector mechanism for a vehicle sliding roof system, comprising:
   a wind deflector lever on a wind deflector element, wherein the wind deflector lever is adapted for attachment to a vehicle and can be swiveled between a home position and a raised position;
   a raising lever which is coupled to the wind deflector lever and can swivel the wind deflector lever between the home position and the raised position; and
   a raising spring which acts upon the raising lever such that the raising lever biases the wind deflector lever toward the raised position.

2. The wind deflector mechanism according to claim 1, wherein the raising lever is coupled with the wind deflector lever such that in the raised position, a self-locking occurs such that the wind deflector lever cannot be shifted toward the home position through forces acting on the wind deflector lever by an air stream.

3. The wind deflector mechanism according to claim 1, wherein the raising lever is coupled with the wind deflector lever by a guiding slot, and wherein the raising lever extends approximately perpendicular to a direction of extension of the guiding slot when the wind deflector lever is in the raised position.

4. The wind deflector mechanism according to claim 1, wherein the wind deflector element is one of a net and a fabric.

5. The wind deflector mechanism according to claim 1, wherein a working point for a movable component of the vehicle sliding roof system is provided on the raising lever.

6. The wind deflector mechanism according to claim 5, wherein the raising spring is arranged relative to a swivel axis of the raising lever such that the raising spring keeps the raising lever in a home position when the wind deflector lever is in the home position.

7. The wind deflector mechanism according to claim 5, wherein the raising lever is coupled with the wind deflector lever such that a produced raising force is larger than a force of the raising spring at least in a vicinity of the raised position.

8. The wind deflector mechanism according to claim 1, including a leg spring which biases the wind deflector lever toward the raised position.

9. The wind deflector mechanism according to claim 1, wherein the wind deflector lever is coupled to a first bearing and the raising lever is coupled to a second bearing positioned forward of the first bearing.

10. The wind deflector mechanism according to claim 9, wherein the raising lever has a first end and a second end, the first end of the raising lever being coupled directly to the second bearing at the vehicle and the second end of the raising lever including a stud coupled to the wind deflector lever.

11. The wind deflector mechanism according to claim 10, wherein the wind deflector lever includes a slot with the stud being slidingly received within the slot.

12. The wind deflector mechanism according to claim 10, wherein the raising spring includes a first spring end and a second spring end, the first spring end being associated with a third bearing and the second spring end directly engaging the raising lever.

13. The wind deflector mechanism according to claim 12, wherein the third bearing is vertically lower than the second bearing and wherein the third bearing is positioned between the first and the second bearings.

14. The wind deflector mechanism according to claim 12, wherein the second spring end is attached to a central portion of the raising lever at a position that is spaced from the first and second ends of the raising lever.

15. The wind deflector mechanism according to claim 14, wherein the raising lever defines a working point that is located between the second end of the raising lever and the second spring end.

16. The wind deflector mechanism according to claim 1, wherein the raising lever is parallel to the wind deflector lever in the home position and is perpendicular to the wind deflector lever in the raised position.

* * * * *